United States Patent Office 3,544,635
Patented Dec. 1, 1970

3,544,635
PROCESS FOR PREPARING ALCOHOLS
AND ALDEHYDES
Lawrence J. Kehoe, Huntington Woods, and Raymond A. Schell, Berkley, Mich., assignors to Ethyl Corporation, New York, N.Y., a corporation of Virginia
No Drawing. Filed Apr. 15, 1968, Ser. No. 721,186
Int. Cl. C07c 45/10
U.S. Cl. 260—604
14 Claims

ABSTRACT OF THE DISCLOSURE

A process is described for preparing alcohols and aldehydes, by reacting olefins, carbon monoxide and water using a rhodium or iridium oxide or sulfide as the catalyst in the presence of an ether or ketone solvent. The reaction is carried out at elevated temperatures (to about 300° C.) and under pressures above atmospheric (to 500 atmospheres).

The alcohols and aldehydes produced contain one carbon atom more than the starting olefin; they are especially useful as solvents and intermediates for the preparation of carboxylic acids, for example.

BACKGROUND OF THE INVENTION

The reaction of an olefin with carbon monoxide and hydrogen using a cobalt carbonyl catalyst to prepare aldehydes is well known. This reaction is commonly called the Oxo reaction. Use of more sophisticated cobalt carbonyl/trialkyl phosphine complex as the catalyst permits in situ reduction of the Oxo aldehyde to the corresponding alcohol.

On the other hand, the reaction of an olefin with carbon monoxide and water using cobalt carbonyl, nickel carbonyl or iron carbonyl is known to produce carboxylic acids; U.S. 2,448,368, U.S. 2,593,440, and R. Ercoli, Chem. Inc. (Milan), 37 (13), 1029–32 (1955).

The reaction of an olefin with carbon monoxide and water is also known to produce alcohols when using an iron carbonyl/heterocyclic tertiary amine complex catalyst. This is known as the Reppe alcohol synthesis; Liebig's Ann. Chem., 582, 133 (1953).

Both the Oxo and Reppe processes are used commercially for preparing alcohols. In each case, a complex carbonyl-containing catalyst must be ordinarily used.

We have discovered that by using a very simple catalyst system (a rhodium or iridium oxide or sulfide) both alcohols and aldehydes can be prepared from the reaction of an olefin, carbon monoxide and water in an ether or ketone reaction medium. The simplicity and effectiveness of the reaction system are an advance in the complex art of chemical catalysis.

SUMMARY OF THE INVENTION

A process for preparing mixtures of alcohols and aldehydes which comprises reacting $C_2$–$C_{40}$ olefins with carbon monoxide and water using a catalytic quantity of a rhodium (or iridium) oxide or sulfide as the catalyst in an alkyl ether or alkyl ketone reaction medium at temperatures of up to about 300° C. and pressures of up to about 500 atmospheres.

Rhodium sesquioxide is an especially effective catalyst.

DESCRIPTION OF THE PREFERRED EMBODIMENTS

The present invention is embodied in a process for preparing aldehydes and alcohols by reacting a $C_2$–$C_{40}$ olefin with carbon monoxide and water in the presence of alkyl ethers having up to 16 carbon atoms or dialkyl ketones having up to about 11 carbon atoms, using as the catalyst a rhodium or iridium oxide or sulfide, at temperatures up to 300° C. and pressures up to about 500 atmospheres. In another preferred embodiment, the process is carried out using a monoolefin as a reactant. Other more preferred embodiments are the process described above using rhodium oxide as the catalyst.

An especially preferred embodiment is the process described above wherein rhodium sesquioxide is the catalyst.

Other preferred embodiments will be described in examples below.

Unsaturated organic compounds which are useful in the present process are those having at least one non-aromatic carbon-to-carbon double bond. These compounds include mono-unsaturates, that is, compounds having one carbon-to-carbon double bond as well as polyunsaturates, that is, compounds having two or more carbon-to-carbon double bonds.

Examples of useful unsaturated compounds are 2-methyl butene-1, 1,3-butadiene, dicyclopentadiene, 1,6,8-octadecatriene, $C_{30}$-monoolefin, $C_{40}$-diolefin, isoprene, 1,3-dodecadiene, 1,3-tetracosadiene and the like. Useful unsaturated compounds may also contain other functional groups such as hydroxy, halo, nitro and the like. Where these other functional groups are present in the unsaturated organic compound they must be in a position relative to the carbon-to-carbon double bond such that these functional groups do not adversely affect the reaction in the present process. Examples of useful unsaturated organic compounds are 4-chloro-octene-1, oleic acid, 9-hydroxy-tetradecene-1, 4-nitrododecene-2, styrene, allyl chloride, vinyl chloride and the like.

Preferred unsaturated organic compounds are olefins containing from 2 to about 40 carbon atoms. By olefins, I mean hydrocarbons having at least one carbon-to-carbon non-aromatic double bond. The preferred olefins are those having only one double bond (monoolefins) or two non-conjugated double bonds (non-conjugated dienes). Non-conjugated means that the two double bonds are separated by at least one carbon atom. Examples of useful non-conjugated dienes are 1,7-octadiene, cyclooctadiene-1,5, 1,5-pentadiene, 1,9-heptadecadiene, 1,6-tetracosadiene, 1,13-tetradecadiene, $C_{40}$-diene, $C_{30}$-diene, and the like. Useful monoolefins include terminal as well as internal olefins. Examples of useful monoolefins are ethylene, hexene-3, propylene, heptene-2, cyclohexene, cyclooctene, butene-1, dodecene-2, diisobutylene, 4,6,6-trimethylheptene-1, dodecene-2, eicosene-3, nonene-3, nonene-4, 2-methylhexene-1, hexadecene-5, triisobutylene, tetracosene-1, $C_{30}$-monoolefin, $C_{40}$-monoolefin, propylene trimer, propylene tetramer, and the like. Mixtures of terminal and internal monoolefins are also useful.

Commercial mixtures of olefins are also quite useful. These commercial mixtures are generally a mixture of various homologous monoolefins such as $C_2,C_4$-olefins; $C_3,C_4,C_5$-olefins; $C_{20},C_{40}$-olefins; $C_6,C_8,C_{10}$-olefins; $C_{12},C_{14}$-olefins; $C_{13},C_{15},C_{17}$ - olefins; $C_{11},C_{12},C_{13},C_{14},C_{15}$ - olefins; $C_{19},C_{20},C_{21}$-olefins; $C_{14},C_{15}$-olefins, and the like. Mixtures containing $C_6$–$C_{24}$ olefins are preferred. Mixtures may contain α-olefins (double bond in the 1,2-position) as well as internal olefins (double bond in a position other than 1,2). These olefins are obtained commercially, for example, by the Ziegler catalyzed polymerization of low molecular weight olefins such as ethylene or propylene; or by the dehydrogenation of suitable paraffins. The mixed olefins thus obtained might also contain minor amounts of other non-homologous olefins, and non-olefin components. In any case, the mixed product obtained from such a commercial synthesis need not be separated into the individual components to be useful.

The catalyst which is used in the present invention is a rhodium or iridium oxide or sulfide. Examples of useful catalysts are rhodium monosulfide, rhodium sesquisulfide, iridium dioxide, iridium disulfide, iridium sesquioxide, iridium sesquisulfide, and the like. Mixtures of the oxides and sulfides are also useful. Preferred catalysts are the rhodium oxides such as rhodium monoxide (RhO) and rhodium dioxide ($RhO_2$); rhodium sesquioxide is a most preferred catalyst.

In carrying out the reaction, an amount of catalyst is used which is sufficient to initiate and continue the reaction under the conditions herein described. Sufficient catalyst is used to provide at least about 0.0001 mole of rhodium (or iridium) per mole of olefin. Amounts of catalyst which provide from about 0.0001 to about one mole of rhodium (or iridium) per mole of olefin are conveniently used.

The amount of water which is used in carrying out the process of this reaction may vary over a wide range. Since water enters into the reaction with the olefin and carbon monoxide, it is desirable to have at least the stoichiometric amount of water present when running the reaction. In general, amounts of water sufficient to have an olefin:water molar ratio of from about 1:1 to about 1:10 are used. Olefin:water molar ratios of from about 1:1 to about 1:5, are conveniently used. Since the olefins, especially the higher olefins and water are relatively immiscible, it is advantageous to stir the mixture during the reaction process.

As pointed out above, the process is carried out in the presence of a solvent. Suitable solvents are organic compounds of the ketone and ether class. Typical solvents useful in this process are the alkyl ketones having up to about 11 carbon atoms such as diisobutyl ketone, cyclohexanone, methylethyl ketone, methylisobutyl ketone, diamyl ketone, cyclohexylethyl ketone, di-n-propyl ketone and the like; and alkyl ethers having from 4 to about 16 carbon atoms such as diethyl ether, 1,4-dioxane, di-n-butyl ether, di-n-hexyl ether, di-2-ethyl-n-hexyl ether, di-$C_1$,$C_4$-alkyl glycol ethers and polyethers such as 1,2-diethoxyethane, bis[2-(2-methoxyethoxy)ethyl]ether, bis (2-butoxyethyl)ether, 1,2 - dipropoxypropane, 1,2-bis[2-(2-methoxyethoxy)ethyl]ethane and the like. Mixtures of these solvents can also be used.

Especially preferred solvents are acetone and 1,2-dimethoxyethane.

Both aldehydes and alcohols are obtained as products in the present process. The reaction will proceed as well in either the ether or ketone reaction medium. The amount of ether or ketone used may be varied. In general, the molar ratio of ether or ketone to olefin used in carrying out the reaction ranges from about 0.1:1 to about 10:1. Reaction medium to olefin molar ratios of from about 0.5:1 to about 5:1 are conveniently used.

Since the third reactant in the process is carbon monoxide (CO), the process of the present invention is carried out at pressures above atmospheric. The pressure is due for the most part to the carbon monoxide. CO pressures ranging up to about 500 atmospheres (atm.) are conveniently used. CO pressures ranging from about 10 to about 500 atmospheres can be used. Pressures ranging from 50 to about 300 atmospheres are conveniently used. The pressure is not critical except that at least a stoichiometric amount of CO should be supplied to the system. By stoichiometric amount, we mean at least one mole of CO for each mole of olefin. Molar excess of carbon monoxide is generally used.

The temperatures at which the reaction is carried out generally ranges from about 75° C. up to about 300° C. Temperatures from about 100° C. to about 250° C. are conveniently used.

Reaction times are not critical per se. Better yields are generally obtained at higher temperature and/or longer reaction times. Good yields are obtained in from about 10 to about 30 hours at the higher reaction temperatures.

The products obtained in the present process generally are mixtures of isomers of alcohols and/or aldehydes. The alcohols and/or aldehyde have one more carbon atom than the starting olefin. The following equation illustrates the reaction. Tetradecene-1 is used as an example of a typical olefin.

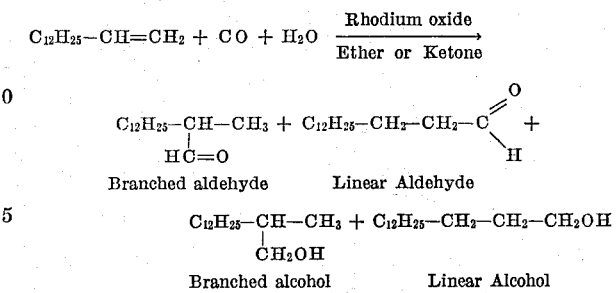

$$C_{12}H_{25}-CH=CH_2 + CO + H_2O \xrightarrow[\text{Ether or Ketone}]{\text{Rhodium oxide}}$$

$$\underset{\text{Branched aldehyde}}{C_{12}H_{25}-\underset{|}{C}H-CH_3} + \underset{\text{Linear Aldehyde}}{C_{12}H_{25}-CH_2-CH_2-C\underset{\diagdown H}{\overset{\diagup O}{}}} +$$
$$\qquad HC=O$$

$$\underset{\text{Branched alcohol}}{C_{12}H_{25}-\underset{|}{C}H-CH_3} + \underset{\text{Linear Alcohol}}{C_{12}H_{25}-CH_2-CH_2-CH_2OH}$$
$$\qquad CH_2OH$$

The weight ratio of linear to branched products ranges in general from about 50/50 to about 20/80. In other words, from 20 to about 50 percent of the alcohol (or aldehyde) product will be the linear alcohol (or aldehyde) while the remainder of the product will be the branched isomer.

In the following example, all parts are by weight unless otherwise specified. Conversion is the measure of olefin which reacts. It is calculated as follows:

Percent conversion =

$$\frac{\text{Moles of olefin charged-moles of olefin recovered}}{\text{Moles of olefin charged}} \times 100$$

The yield is the measure of the amount of reacted olefin which is alcohol or aldehyde. It is calculated as follows:

Percent yield =

$$\frac{\text{Moles of product (aldehyde or alcohol)}}{\text{Moles of olefin charged-moles of olefin recovered}} \times 100$$

EXAMPLE 1

A suitably sized autoclave was charged with 43.8 parts of 1-dodecene, about 96 parts of acetone, about 25 parts of water and 0.38 parts of rhodium sesquioxide. The autoclave was flushed twice with carbon monoxide. Carbon monoxide was introduced into the autoclave to a pressure of 2000 p.s.i. (about 133 atmospheres). The autoclave was then heated to 175° C. At this temperature the pressure reading was 3050 p.s.i. The reaction was allowed to continue at this temperature for 24 hours. Over this period of time, the pressure dropped 500 p.s.i. At the end of the 24 hours, the autoclave was cooled and the pressure was released. 158 parts of a black liquid product was obtained. The product was analyzed by Vapor Phase Chromatography (VPC). The yield of $C_{13}$ alcohols obtained was 83 percent, of which 20 percent were linear, that is, n-tridecanol; the yield of $C_{13}$ aldehydes was 25 percent, of which 20 percent were linear.

Similar results are obtained when methylethyl ketone, methylisobutyl ketone, di-amyl ketone, di-isobutyl ketone, 1,2-dimethoxyethane and the like are used in place of the acetone in the above example.

The following examples further illustrate the process of the present invention. All parts are by weight.

EXAMPLE 2

An autoclave is charged with one mole of ethylene, one mole of di-n-pentyl ketone, one mole of water and 0.0001 mole of RhO. Carbon monoxide is introduced into the vessel to a pressure of 200 atmospheres. The vessel is heated to 200° C. The mixture is then stirred at this temperature for 15 hours. At the end of this time, the vessel is allowed to cool. The pressure is released and the product is recovered.

A good yield of a mixture of $C_3$ alcohol and aldehyde is obtained.

EXAMPLE 3

An autoclave is charged with one mole of triacontene, 0.1 mole of di-n-propyl ketone, 2 moles of water and 0.5 moles of $RhO_2$. Carbon monoxide is introduced into the vessel to a pressure of 300 atmospheres. The vessel is heated to 300° C. The mixture is then stirred at this temperature for 25 hours. At the end of this time, the vessel is allowed to cool. The pressure is released and the product is recovered.

A good yield of a mixture of $C_{31}$ alcohols and aldehydes is obtained.

EXAMPLE 4

An autoclave is charged with one mole of 1-undecene, 3 moles of ethylmethyl ketone, 5 moles of water and 0.05 moles of RhS. Carbon monoxide is introduced into the vessel to a pressure of 500 atmospheres. The vessel is heated to 150° C. The mixture is then stirred at this temperature for 30 hours. At the end of this time, the vessel is allowed to cool. The pressure is released and the product is recovered.

A good yield of a mixture of $C_{12}$ alcohols and aldehydes is obtained.

EXAMPLE 5

An autoclave is charged with one mole of diisobutylene, 0.5 moles of diisopropyl ketone, 4 moles of water and 0.15 moles of $Rh_2S_3$. Carbon monoxide is introduced into the vessel to a pressure of 50 atmospheres. The vessel is heated to 100° C. The mixture is then stirred at this temperature for 40 hours. At the end of this time, the vessel is allowed to cool. The pressure is released and the product is recovered.

A good yield of a mixture of $C_9$ alcohols and aldehydes is obtained.

EXAMPLE 6

An autoclave is charged with one mole of 2-octadecene, 4 moles of methylisobutyl ketone, 1.5 moles of water and 0.004 mole of $IrO_2$. Carbon monoxide is introduced into the vessel to a pressure of 400 atmospheres. The vessel is heated to 175° C. The mixture is then stirred at this temperature for 28 hours. At the end of this time, the vessel is allowed to cool. The pressure is released and the product is recovered.

A good yield of a mixture of $C_{19}$ alcohols and aldehydes is obtained.

EXAMPLE 7

An autoclave is charged with one mole of 1,5-heptadiene, 8 moles of diethyl ketone, 2.5 moles of water and 0.0005 moles of $Ir_2O_3$. Carbon monoxide is introduced into the vessel to a pressure of 10 atmospheres. The vessel is heated to 275° C. The mixture is then stirred at this temperature for 35 hours. At the end of this time, the vessel is allowed to cool. The pressure is released and the product is recovered.

A good yield of a mixture of mono-unsaturated $C_8$ alcohols and aldehydes is obtained.

EXAMPLE 8

An autoclave is charged with one mole of 1,3-butadiene, 6 moles of cyclohexane, 4.5 moles of water and 0.02 moles of $IrS_2$. Carbon monoxide is introduced into the vessel to a pressure of 75 atmospheres. The vessel is heated to 190° C. The mixture is then stirred at this temperature for 18 hours. At the end of this time, the vessel is allowed to cool. The pressure is released and the product is recovered.

A good yield of a mixture of $C_5$ alcohols and aldehydes is obtained.

EXAMPLE 9

An autoclave is charged with one mole of a mixture of 50 percent octenes and 50 percent decenes, 5 moles of cyclohexylmethyl ketone, 9 moles of water and 0.00005 mole of $Rh_2O_3$. Carbon monoxide is introduced into the vessel to a pressure of 25° atmospheres. The vessel is heated to 225° C. The mixture is then stirred at this temperature for 22 hours. At the end of this time the vessel is allowed to cool. The pressure is released and the product is recovered.

A good yield of a mixture of $C_9$ and $C_{11}$ alcohols and aldehydes is obtained.

EXAMPLE 10

An autoclave is charged with one mole of cyclohexene, 2 moles of ethyl(2-ethyl-n-hexyl)ketone, 1.1 moles of water and 0.006 moles of $RhO_2$. Carbon monoxide is introduced into the vessel to a pressure of 160 atmospheres. The vessel is heated to 125° C. The mixture is then stirred at this temperature for 14 hours. At the end of this time, the vessel is allowed to cool. The pressure is released and the product is recovered.

A good yield of a mixture of cyclohexyl carbinol and cyclohexyl aldehyde is obtained.

EXAMPLE 11

An autoclave is charged with one mole of tetracontene, 10 moles of 1,4-dioxane, 10 moles of water and 0.4 mole of RhS. Carbon monoxide is introduced into the vessel to a pressure of 450 atmospheres. The vessel is heated to 260° C. The mixture is then stirred at this temperature for 38 hours. At the end of this time, the vessel is allowed to cool. The pressure is released and the product is recovered.

A good yield of a mixture of $C_{41}$ alcohols and aldehydes is obtained.

EXAMPLE 12

An autoclave is charged with one mole of tetracosene, 0.0004 moles of $IrO_2$, 8 moles of water and 7 moles of di-2-ethylhexyl ether. Carbon monoxide is introduced into the vessel to a pressure of 225 atmospheres. The vessel is heated to 240° C. The mixture is then stirred at this temperature for 32 hours. At the end of this time, the vessel is allowed to cool. The pressure is released and the product is recovered.

A good yield of a mixture of $C_{25}$ alcohols and aldehydes is obtained.

EXAMPLE 13

An autoclave is charged with one mole of 3-tetradecene, 0.4 mole of 1,2-diethoxyethane, 2.5 moles of water and 0.003 mole of $IrS_2$. Carbon monoxide is introduced into the vessel to a pressure of 425 atmospheres. The vessel is heated to 285° C. The mixture is then stirred at this temperature for 32 hours. At the end of this time, the vessel is allowed to cool. The pressure is released and the product is recovered.

A good yield of a mixture of $C_{15}$ alcohols and aldehydes is obtained.

When 1,2-dimethoxyethane bis[2(2-methoxyethoxy)ethyl]ether, or diisopropoxy propane are used in place of the 1,2-diethoxyethane in Example 13, similar results are obtained.

EXAMPLE 14

An autoclave is charged with one mole of 1-pentene, 1.2 moles of 1,2-bis[2-(2-butoxyethoxy)ethoxy] ethane, 2.8 moles of water and 0.00015 moles of $RhO_2$. Carbon monoxide is introduced into the vessel to a pressure of 185 atmospheres. The vessel is heated to 180° C. The mixture is then stirred at this temperature for 21 hours. At the end of this time, the vessel is allowed to cool. The pressure is released and the product is recovered.

A good yield of a mixture of $C_6$ alcohols and aldehydes is obtained.

EXAMPLE 15

An autoclave is charged with one mole of a mixture of hexenes (40 percent 1-hexene, 38 percent 2-hexene, 18 percent 3-hexene, 4 percent other $C_6$ isomers), 0.9 moles tetrahydrofuran, 6 moles of water and 0.0003 moles of RhS. Carbon monoxide is introduced into the vessel to a pressure of 100 atmospheres. The vessel is heated to 130° C. The mixture is then stirred at this temperature for 18 hours. At the end of this time, the vessel is allowed to cool. The pressure is released and the product is recovered.

A good yield of a mixture of $C_7$ alcohols and aldehydes is obtained.

EXAMPLE 16

An autoclave is charged with one mole of a mixture of monoolefins (30 percent $C_8$, 40 percent $C_{10}$, 30 percent $C_{12}$), 2.3 moles of 1,3-dioxane, 8 moles of water and 0.00015 moles of $IrS_2$. Carbon monoxide is introduced into the vessel to a pressure of 210 atmospheres. The vessel is heated to 215° C. The mixture is then stirred at this temperature for 26 hours. At the end of this time, the vessel is allowed to cool. The pressure is released and the product is recovered.

A good yield of a mixture of $C_9$, $C_{11}$ and $C_{13}$ alcohols and aldehydes is obtained.

EXAMPLE 17

An autoclave is charged with one mole of 1,7-octadiene, 8 moles of bis[2-(2-ethoxyethoxy)ethyl] ether, 3 moles of water and 0.0004 moles of RhO. Carbon monoxide is introduced into the vessel to a pressure of 450 atmospheres. The vessel is heated to 130° C. The mixture is then stirred at this temperature for 12 hours. At the end of this time, the vessel is allowed to cool. The pressure is released and the product is recovered.

A good yield of a mixture of $C_9$ alcohols and aldehydes is obtained.

EXAMPLE 18

An autoclave is charged with one mole of 4,6-dimethyl-1-heptene, 0.7 mole of bis(2-butoxyethyl) ether, 1.8 moles of water and 0.01 mole of $Ir_2O_3$. Carbon monoxide is introduced into the vessel to a pressure of 120 atmospheres. The vessel is heated to 195° C. The mixture is then stirred at this temperature for 17 hours. At the end of this time, the vessel is allowed to cool. The pressure is released and the product is recovered.

A good yield of a mixture of $C_{11}$ alcohols and aldehydes is obtained.

EXAMPLE 19

An autoclave is charged with one mole of 1,3-decadiene, 2.2 moles of 1,2-dibutoxy ethane, 2.4 moles of water and 0.0009 moles of $RhS_2$. Carbon monoxide is introduced into the vessel to a pressure of 215 atmospheres. The vessel is heated to 115° C. The mixture is then stirred at this temperature for 37 hours. At the end of this time, the vessel is allowed to cool. The pressure is released and the product is recovered.

A good yield of a mixture of monounsaturated $C_{11}$ alcohols and aldehydes is obtained; the alcohols are the predominant product.

The aldehyde and alcohol mixtures obtained from the present process have many uses. They can be used, for example as solvents; as chemical intermediates for preparing carboxylic acids; as plasticizers, and the like. The mixture of aldehyde and alcohols produced may be used as such, or if desired, they may be separated into their component aldehydes and alcohols. Separation can be effected by methods known to those skilled in the art. For example, alcohols and aldehydes may be separated by selective adsorption.

Having fully described the invention, it is desired that it be limited only within the spirit and scope of the claims.

We claim:

1. A process for preparing mixtures of alcohols and aldehydes which comprises reacting olefins having from 2 to 40 carbon atoms with carbon monoxide and water in a reaction medium selected from the group consisting of alkyl ethers having from 4 to 16 carbon atoms and dialkyl ketones having from 3 to about 11 carbon atoms, using as the catalyst a compound selected from the group consisting of the oxides and sulfides of rhodium and iridium at temperatures of from about 75° C. to about 300° C. and at pressures of from about 10 atmospheres to about 500 atmospheres, said alcohols and aldehydes being characterized by having one carbon atom more than said olefin.

2. The process of claim 1 wherein said olefin has from 6 to 24 carbon atoms.

3. The process of claim 2 wherein said solvent is a dialkyl ketone.

4. The process of claim 3 wherein said catalyst is an oxide of rhodium.

5. The process of claim 4 wherein said olefin is a monoolefin.

6. The process of claim 5 wherein said dialkyl ketone is acetone.

7. The process of claim 6 wherein said olefin is 1-dodecene and said catalyst is rhodium sesquioxide.

8. The process of claim 1 wherein said temperature is from about 100° C. to about 200° C.

9. The process of claim 1 wherein said olefins are selected from monoolefins and non-conjugated diolefins.

10. The process of claim 9 wherein said olefins are monoolefins.

11. The process of claim 1 wherein said reaction medium is an alkyl ether.

12. The process of claim 1 wherein said catalyst is an oxide of rhodium.

13. The process of claim 12 wherein said oxide is rhodium sesquioxide.

14. The process of claim 13 wherein said olefin is 1-dodecene, said reaction temperature is about 175° C., said reaction medium is acetone and said reaction pressure is about 133 atmospheres.

References Cited

UNITED STATES PATENTS

| | | | |
|---|---|---|---|
| 3,020,314 | 2/1962 | Alderson | 260—604 |
| 2,694,734 | 11/1954 | Hagenmeyer et al. | 260—604 |

FOREIGN PATENTS

| | | | |
|---|---|---|---|
| 801,734 | 9/1958 | Great Britain | 260—604 |
| 40/22,735 | 10/1965 | Japan | 260—604 |

BERNARD HELFIN, Primary Examiner

R. H. LILES, Assistant Examiner

U.S. Cl. X.R.

252—431; 260—526, 535, 598, 602, 617, 632, 633, 635